(12) United States Patent
Rohatinovici

(10) Patent No.: US 7,530,626 B2
(45) Date of Patent: May 12, 2009

(54) SAFETY EQUIPMENT FOR USE ON FLATBED TRAILERS

(76) Inventor: Pavel Rohatinovici, 2535 S. US 35, Knox, IN (US) 46534

( * ) Notice: Subject to any disclaimer, the term of this patent is extended or adjusted under 35 U.S.C. 154(b) by 276 days.

(21) Appl. No.: 11/674,030

(22) Filed: Feb. 12, 2007

(65) Prior Publication Data
US 2007/0207019 A1   Sep. 6, 2007

Related U.S. Application Data

(60) Provisional application No. 60/743,270, filed on Feb. 10, 2006.

(51) Int. Cl.
*B62D 33/02* (2006.01)
(52) U.S. Cl. .............. 296/184.1; 182/3; 182/5; 52/DIG. 12
(58) Field of Classification Search .............. 296/184.1; 182/3, 5, 231–235; 52/DIG. 12
See application file for complete search history.

(56) References Cited

U.S. PATENT DOCUMENTS 4,171,032 A * 10/1979 Woolslayer et al. ............ 182/3
6,478,111 B2 * 11/2002 Olson et al. .................. 182/3

FOREIGN PATENT DOCUMENTS

| AU | 2005203153 | * | 2/2007 |
| FR | 2571670 | * | 4/1988 |

* cited by examiner

*Primary Examiner*—Dennis H Pedder
(74) *Attorney, Agent, or Firm*—Hartman & Hartman P.C.; Gary M. Hartman; Domenica N. S. Hartman

(57) ABSTRACT

A safety equipment for use on a trailer to reduce the risk of an operator falling from a load on the trailer. The safety equipment includes an arm having an articulating portion, a feature for selectively securing the arm to the periphery of the trailer, a feature associated with the arm for enabling the articulating portion thereof to pivot toward and away from a widthwise edge of the trailer in a plane approximately parallel to the bed of the trailer, a feature for securing the articulating portion at any one of a plurality of articulated positions, a post extending from the arm in a direction transverse to the pivot plane of the articulating portion, a cable having a first portion thereof secured to the post, and a feature for securing a second portion of the cable at the oppositely-disposed widthwise edge of the trailer such that the cable extends along a lengthwise direction of the trailer.

20 Claims, 4 Drawing Sheets

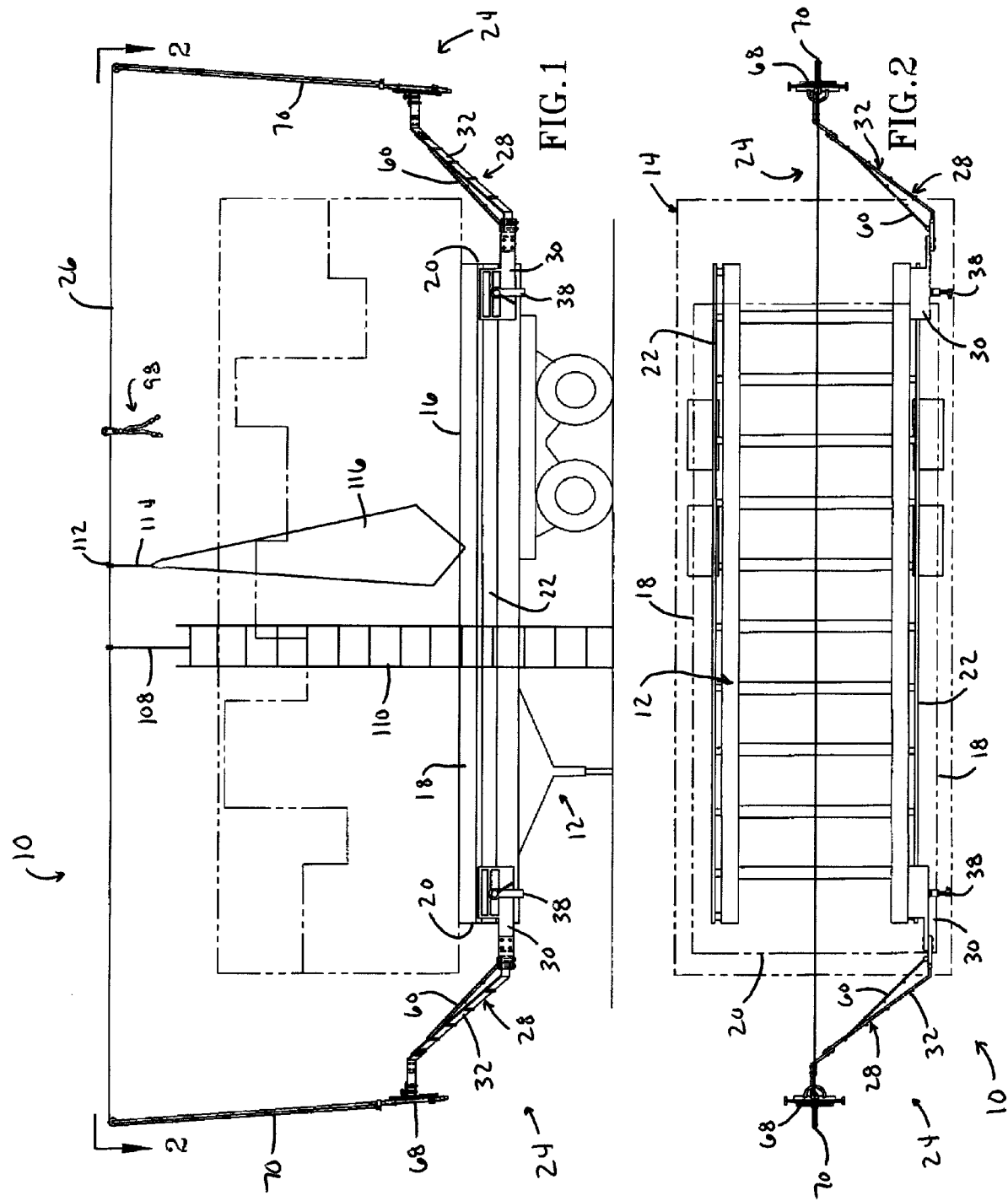

SAFETY EQUIPMENT FOR USE ON FLATBED TRAILERS

CROSS REFERENCE TO RELATED APPLICATIONS

This application claims the benefit of U.S. Provisional Application No. 60/743,270, filed Feb. 10, 2006, the contents of which are incorporated herein by reference.

BACKGROUND OF THE INVENTION

The present invention generally relates to safety equipment and vehicles configured for transporting cargo. More particularly, this invention relates to flatbed trailers and other platforms adapted to support cargo, and to safety equipment suitable for securing an individual while walking on the cargo to prevent accidental falls.

The loading and securing of flatbed loads typically require the operator or other individual to climb and walk on the cargo (load). To ensure safe loading of flatbed trailers, most trucking companies in the United States require that operators follow a variety of procedures and employ safety equipment to reduce the risk of injury. However, flatbed loads can be in a wide variety of shapes and sizes, and operators must load and secure their loads in all types of weather, at times without assistance or supervision. Furthermore, there is considerable resistance to the use of safety equipment if much time and effort are required for installation. As a result, many work-related injuries occur with loaded flatbed trailers, the most severe of which often involve the operator failing from the trailer while walking on top of the cargo.

In view of the above, it would be desirable if safety equipment were available that could be easily installed and used by an flatbed operator without assistance.

BRIEF SUMMARY OF THE INVENTION

The present invention provides safety equipment for use on a trailer for transporting cargo, and a method for installing and using the safety equipment to reduce the risk of an operator failing from a load on the trailer.

The safety equipment includes an arm having an articulating portion, a feature for selectively securing the arm to the periphery of the trailer, a feature associated with the arm for enabling the articulating portion thereof to pivot toward and away from a widthwise edge of the trailer in a plane approximately parallel to the bed of the trailer, a feature for securing the articulating portion at any one of a plurality of articulated positions, a post extending from the arm in a direction transverse to the pivot plane of the articulating portion, a cable having a first portion thereof secured to the post, and a feature for securing a second portion of the cable at the oppositely-disposed widthwise edge of the trailer such that the cable extends along a lengthwise direction of the trailer.

With the safety equipment set forth above, the operator of the trailer can secure himself or herself to the cable to prevent accidental falls from the trailer, particularly when loaded. According to a preferred aspect of the invention, the safety equipment is uncomplicated, adjustable, and can be assembled and disassembled for storage without the use of any tools. As such, the safety equipment is preferably configured to be easily installed and removed, allowing the operator to quickly install the safety equipment when the operator is required to climb atop the load, such as when the load is being loaded and secured on the trailer. The safety equipment can remain with the trailer or can be easily transferred between trailers.

Other objects and advantages of this invention will be better appreciated from the following detailed description.

BRIEF DESCRIPTION OF THE DRAWINGS

FIGS. 1 and 2 are side and plan views, respectively, of a flatbed trailer on which safety equipment is installed in accordance with a preferred embodiment of this invention.

DETAILED DESCRIPTION OF THE INVENTION

Figure 3:
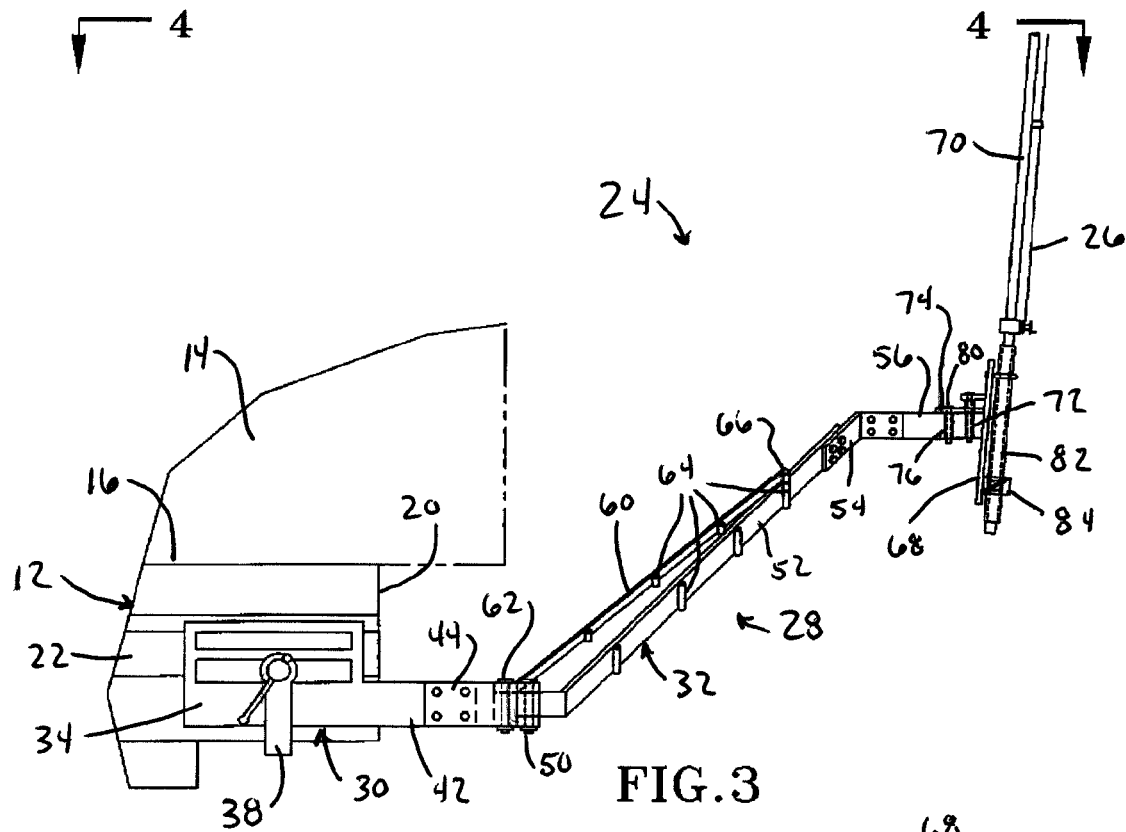
FIGS. 3 and 4 are detailed side and plan views, respectively, of a section of the safety equipment located at the righthand end of the trailer of FIG. 1.
Figure 4:
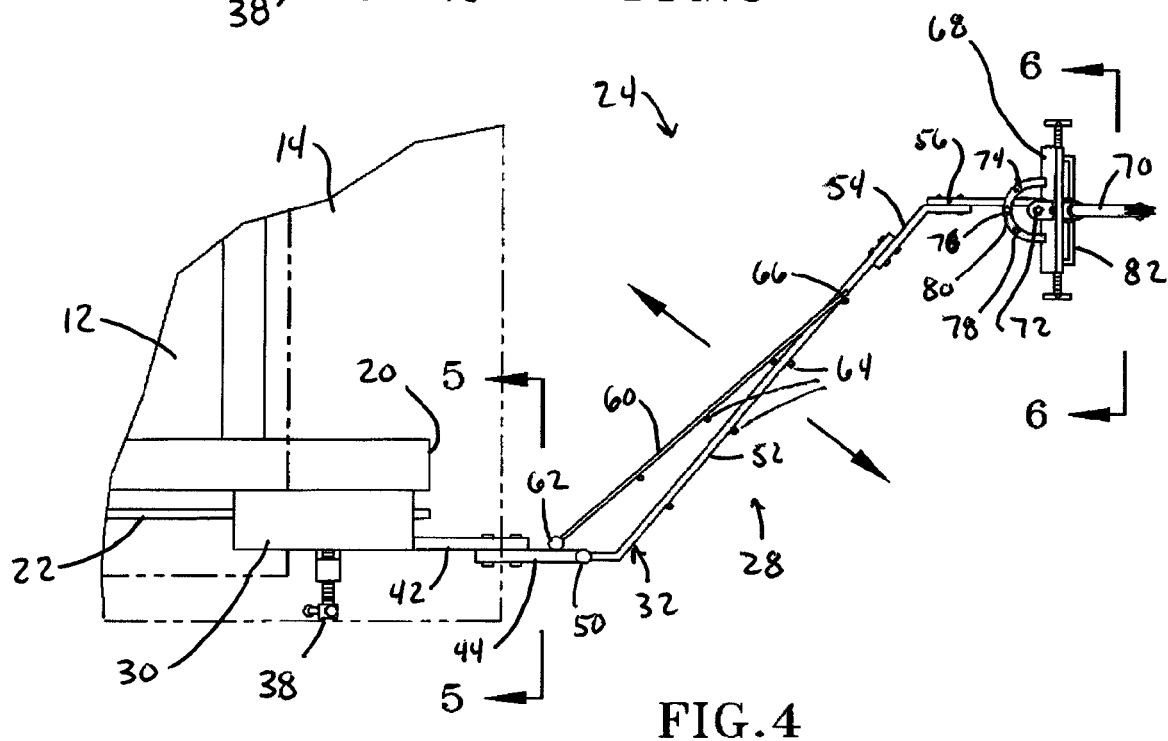
Figure 5:
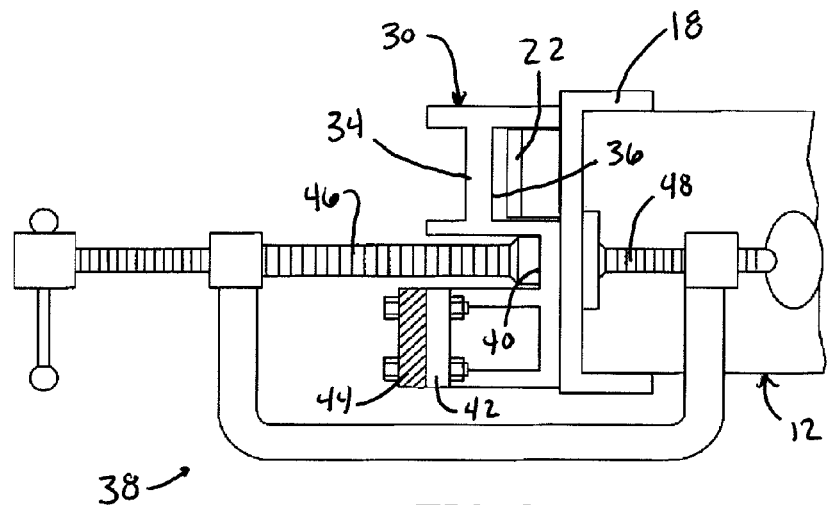
FIG. 5 is a cross-sectional view taken along section line 5-5 in FIG. 4.

The Figures are drawn for purposes of clarity when viewed in combination with the following description, and therefore are not necessarily to scale.

FIGS. 1 and 2 show safety equipment 10 installed on a flatbed trailer 12, and FIGS. 3 through 9 represent detailed views of certain portions of the safety equipment 10 in accordance with a preferred embodiment of the invention. The trailer 12 is represented as being loaded with cargo 14, whose profile is shown in phantom. The cargo 14 can be essentially any object or objects, material, etc., of the type that might be transported or stored by trailer. The cargo 14 is represented as having an irregular profile to emphasize safety features of the equipment 10, though trailers loaded with entirely uniform cargo can also benefit from this invention. The trailer 12 is depicted as having a typical configuration for a flatbed, in which a substantially flat bed 16 defines a rectangular periphery having lengthwise (side) edges 18 and widthwise (front and rear) edges 20. Rails 22 extend along each of the lengthwise edges 18 to allow the use of cables, harnesses, etc., to tie down a load on the trailer 12. While a flatbed trailer 12 is shown, the safety equipment 10 can be used with various other trailer configurations, and even with other types of platforms and support structures, both mobile and stationary, on which one or more objects can be supported.

The safety equipment 10 is shown as including a pair of arm assemblies 24 between which a cable 26 is secured and extends in the lengthwise direction of the trailer 12. The arm assemblies 24 are shown as being located near corners on the same side of the trailer 12, though it is also permissible to locate the arm assemblies 24 at opposite corners of the trailer 12. Each of the arm assemblies 24 includes an arm 28 having a base 30 and an articulating portion 32. Each base 30 secures its respective arm assembly 24 to one of the lengthwise edges 18 of the trailer 12 at a location adjacent one of the widthwise edges 20 of the trailer 12. As more readily seen in FIG. 5, each base 30 has a preferably welded construction that includes a bracket 34 with a channel 36 sized and oriented to receive the rail 22 associated with the lengthwise edge 18 on which the arm assembly 24 is mounted. A C-clamp 38 secures the bracket 34 to the trailer 12, with one threaded rod 46 of the clamp 38 being received in a recess 40 defined in the bracket 34 immediately below the channel 36, and a second threaded rod 48 engaging the inside of a C-channel beam that forms the lengthwise edge 18 of the trailer 12. Those skilled in the art will appreciate that a variety of other types of clamping devices can be used in addition to or in place of the C-clamp 38, and that such devices are also within the scope of the invention. With the configuration shown in FIGS. 1, 2, 3, and 4, the base 30 can be secured to the trailer 12 without any tools, and the rail 22 and channel 36 cooperate to prevent rotation of the bracket 30 in the vertical plane.

As shown in FIGS. 1, 2, 3, and 4, the base 30 further includes a bar 42 that extends from the bracket 34 in the lengthwise direction of the trailer 12. Another bar 44, which forms part of the arm 28, is bolted to the bar 42 and extends further in the lengthwise direction of the trailer 12. The bar 44 terminates in an articulating joint, represented as a hinge 50, though other articulating mechanisms could be used. The hinge 50 serves to pivotally support the articulating portion 32 of the arm 28, including a beam 52 that angles upwardly from the hinge 50, a support bracket 56 at the end of the arm 28, and an angular bracket 54 that connects the bracket 56 to the beam 52. The hinge 50 enables the arm 28 to rotate in a plane approximately parallel to the horizontal bed 16 of the trailer 12, such that the support bracket 56 can be moved toward and away from the adjacent widthwise edge 20 of the trailer 12, as evident from FIGS. 3 and 4. The arm 28 is locked into a position with a rod 60 that, similar to the arm 28, is also connected to the bar 44 with a hinge 62. To provide a simple yet selective technique for orienting the arm 28 and positioning the support bracket 56 a desired distance from the widthwise edge 20 of the trailer 12 (thereby accommodating cargo of various sizes), the arm 28 and the rod 60 are both equipped with tubular members 64 along their lengths that, when a pair of the tubular members 64 are aligned, allow a pin 66 to be used to lock the arm 28 at a desired articulated position. As such, the arm 28 can be locked into a desired position relative to the trailer 12 without the use of any tools. Furthermore, the hinge 50 is preferably held together with a pin (similar to the tubular members 64 and pin 66) that allows the arm 28 to be removed from the base 30.

Figure 3A:
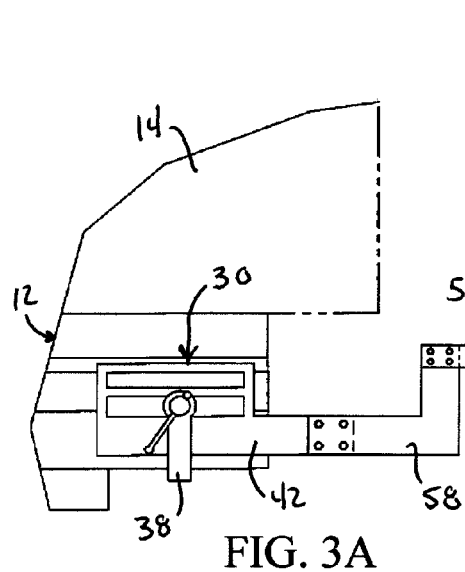
FIG. 3A is a detailed side view of an alternative configuration for the safety equipment depicted in FIG. 3.

FIG. 3A is a view corresponding to FIG. 3, but with the arm 28 replaced by a single L-shaped bracket 58. For those situations where the movability of the arm 28 is or may be unnecessary, the bracket 58 can be an accessory to the safety equipment 10 in addition to the arm 28, or in place of the arm 28.

An articulating plate 68 is mounted to the support bracket 56 and supports a post 70. The post 70 can be a unitary piece or, more preferably, a multi-piece telescoping unit that allows its length to be adjusted for the height of the cargo 14. From FIGS. 1 and 3, it can be seen that the post 70 extends in an upward direction transverse to the pivot plane of the arm 28, and generally away from the trailer 12. To promote the ability to position the post 70 in a desired orientation relative to the trailer 12, the articulating plate 68 is preferably secured to the support bracket 56 with a hinge 72, such as a pin and tube assembly similar to the pin 66 and tubular members 64 of the arm 28 and rod 60. As evident from FIGS. 3 and 4, the hinge 72 enables the articulating plate 68 to be pivoted in a plane approximately parallel to the bed 16, and therefore also roughly parallel to the pivot plane of the arm 28. An arcuate bar 74 projects from the articulating plate 68, with holes 78 formed in the bar 74 that can be aligned with a tubular member 76 on the support bracket 56 and secured thereto with a pin 80. As such, the articulating plate 68 can be locked into a desired position relative to the support bracket 56 without the use of any tools.

Figure 6:
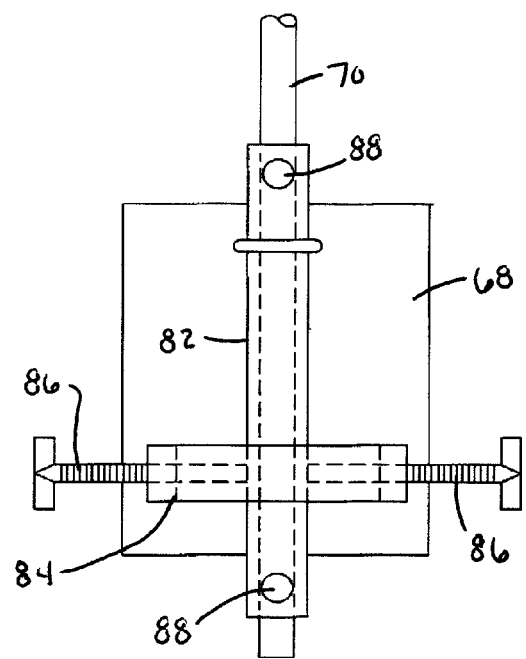
FIG. 6 is an end view taken along section line 6-6 in FIG. 4.

The articulating plate 68 is also shown equipped to permit the post 70 to be pivoted in a plane parallel to the plate 68, which in the orientation shown in FIGS. 1 through 4 is roughly vertical. In FIG. 6, the post 70 is shown as being secured within a tube 82 with set screws 88. The tube 82 is secured to the plate 68 near its upper end in a manner that allows the tube 82 to have a limited ability to pivot in a plane parallel to the plate 68. A C-shaped bracket 84 is secured to the plate 68 and bridges the tube 82 near its lower end, such that the tube 82 is closely held between the plate 68 and the C-shaped bracket 84. Threaded adjustment rods 86 are threaded into bores at opposite ends of the C-shaped bracket 84 and abut opposite sides of the tube 82, so that the lower end of the tube 82 can be positioned from side to side and secured while the upper end of the tube 82 remains relative fixed to the plate 68.

Figure 7:
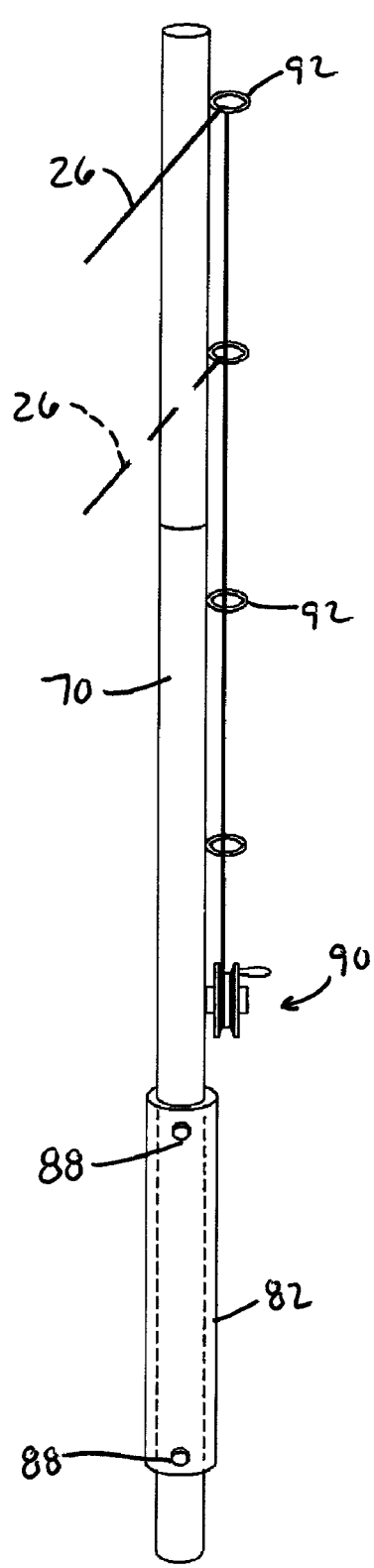
FIGS. 7 is detailed side view of a support post of the safety equipment of FIG. 1.
Figure 8:
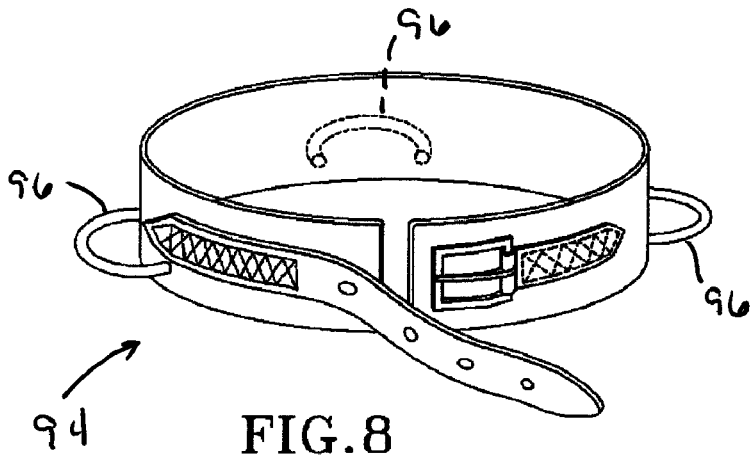
FIG. 8 shows a safety belt for use with the safety equipment of FIG. 1.
Figure 9:
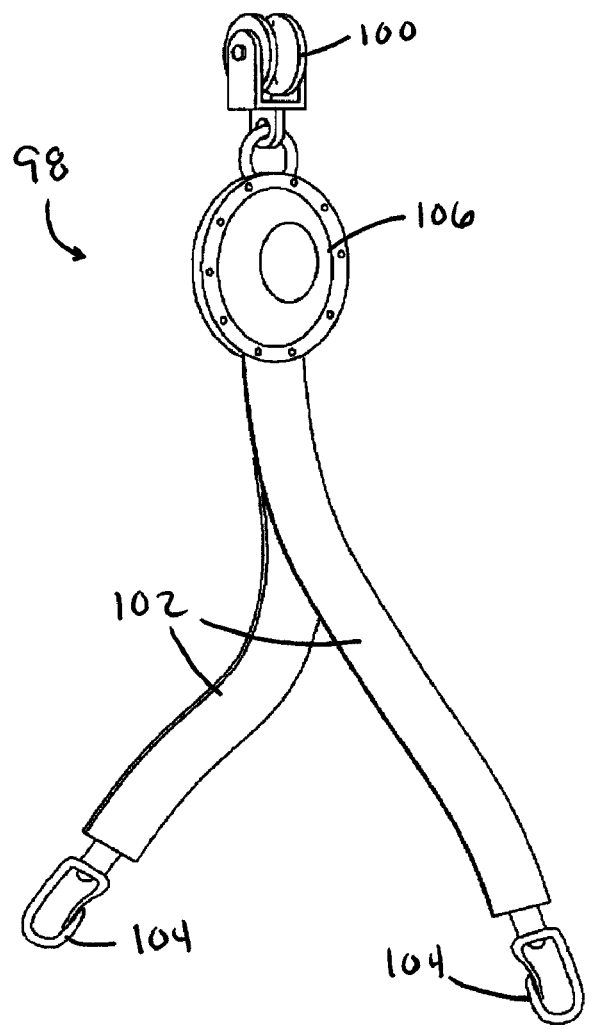
FIG. 9 shows a safety harness for connecting the safety belt of FIG. 8 to the safety equipment of FIG. 1.

FIG. 7 shows the cable 26 as passing through eyelets 92 on the post 70, with a crank 90 mounted on the post 70 to enable the cable 26 to be tensioned. As indicated in phantom, the cable 26 does not need to pass through every eyelet 92 to the top of the post 70, but can traverse the trailer 12 from any of the eyelets 92. FIG. 8 shows a belt 94 to be worn by a person when walking on the cargo 14 of the trailer 12, and FIG. 9 shows a harness 98 for securing the belt 94 to the cable 26. The belt 94 is equipped with three rings 96, two of which are preferably positioned on the wearer's sides when wearing the belt 94, with the third located at the wearer's back. The harness 98 includes a pulley 100 and two straps 102 that terminate with clasps 104. As evident from FIG. 1, the pulley 100 is intended to couple the harness 98 to the cable 26, while the clasps 104 are adapted to be secured to two of the three rings 96 of the belt 94. It is believed preferred that one of the straps 102 is always attached to the rear ring 96 of the belt 94, and that the remaining strap 102 is attached to whichever side ring 96 is most convenient, for example, depending on which direction the wearer is facing while working on the cargo 14. It is also preferred that the straps 102 are relative stiff so as to reduce the likelihood of the straps 102 becoming entangled. The harness 98 is also shown as being equipped with a fall-limiting device 106 from which the straps 102 can be retracted and extended, but which offers resistance to rapid deployment of the straps 102 (as in the case of the wearer failing). In a preferred embodiment, this resistance feature is adjustable and has the capability of stopping the deployment of the straps 102 after about one foot (about 0.3 meter) has been meted from the fall-limiting device 106. A suitable commercial embodiment of a harness with the features described above is the SCORPION® Retractable Fall Limiter, commercially available from Intersafe Wholesale Safety, Inc.

As optional accessories, the safety equipment 10 is shown in FIG. 1 as including a safety strap 108 that can be attached to the cable 26 to secure a ladder 110, and a pulley 112 and cord 114 by which a tarp 116 or other equipment can be raised onto the cargo 14.

From the above, it can be appreciated that the safety equipment 10 can be easily and quickly mounted and removed from the trailer 12 without any conventional or special tools, and its arm assemblies 24 articulated to position the posts 70 essentially anywhere at the front and rear of the trailer 12. As such, the safety equipment 10 of this invention can be quickly and easily configured to permit an individual to safely walk on cargo 14 of generally any size and located anywhere on the trailer 12.

While the invention has been described in terms of a preferred embodiment, it is apparent that other forms could be adopted by one skilled in the art. For example, the overall physical appearance and configuration of the safety equipment 10 could differ from that shown, such as by using only one arm assembly 24 to secure one end of the cable 26 and attaching the opposite end of the cable 26 to an existing structure of the trailer 12 or cargo 14. Furthermore, numerous functional equivalents exist for individual components of the equipment 10, such as the brackets, beams, hinges, pins, etc., described and shown in the Figures. Therefore, the scope of the invention is to be limited only by the following claims.

The invention claimed is:

1. Safety equipment for use on a trailer for transporting cargo, the trailer having a bed structure for supporting the cargo, a length, a width transverse to the length, and a periphery surrounding the bed structure and defined by first and second lengthwise edges and first and second widthwise edges of the trailer, the safety equipment comprising:
   an arm having an articulating portion;
   means for selectively securing the arm to the periphery of the trailer;
   means associated with the arm for enabling the articulating portion thereof to pivot in a plane toward and away from the first widthwise edge of the trailer;
   means for securing the articulating portion at any one of a plurality of articulated positions;
   a post extending from the arm in a direction transverse to the pivot plane of the articulating portion;
   a cable having a first portion thereof secured to the post; and
   means for securing a second portion of the cable at the second widthwise edge of the trailer such that the cable extends along a lengthwise direction of the trailer.

2. The safety equipment according to claim 1, further comprising means for securing the post to the arm, the post securing means comprising means for pivoting the post in a plane approximately parallel to the bed structure.

3. The safety equipment according to claim 2, wherein the post securing means orients the post at an angle so that an upper distal end of the post extends away from the trailer.

4. The safety equipment according to claim 2, wherein the post securing means comprises means for pivoting the post in a plane approximately perpendicular to the bed structure.

5. The safety equipment according to claim 1, wherein the arm securing means comprises a bracket having a recess sized and oriented to receive a portion of the periphery of the trailer and a clamp for securing the bracket to the periphery.

6. The safety equipment according to claim 5, wherein the arm securing means is configured to secure the arm to the first lengthwise edge of the trailer.

7. The safety equipment according to claim 5, wherein the arm securing means is configured to secure the arm to a rail extending along the first lengthwise edge of the trailer.

8. The safety equipment according to claim 1, further comprising means for tensioning the cable between the post and the cable securing means.

9. The safety equipment according to claim 1, further comprising:
   a belt adapted to be worn around the waist of a person; and
   means for securing the belt to the cable.

10. The safety equipment according to claim 9, wherein the belt securing means comprises means for allowing but resisting travel of the belt away from the cable.

11. The safety equipment according to claim 1, wherein the articulating portion securing means comprises a rod, means for securing the rod to the arm, and means for securing the rod to the articulating portion.

12. The safety equipment according to claim 1, wherein the means for securing the rod to the articulating portion comprises tubular members on the rod and on the articulating portion, and a pin simultaneously receivable in a pair of the tubular members on the rod and on the articulating portion.

13. The safety equipment according to claim 1, wherein the cable securing means comprises:
   an arm;
   means for selectively securing the arm of the cable securing means to the periphery of the trailer;
   means associated with the arm of the cable securing means for enabling at least one articulating portion thereof to pivot toward and away from the second widthwise edge of the trailer in a plane approximately parallel to the bed structure of the trailer;
   means for securing the articulating portion of the cable securing means at any one of a plurality of articulated positions; and
   a post extending from the arm of the cable securing means in a direction transverse to the pivot plane of the articulating portion of the cable securing means.

14. The safety equipment according to claim 1, wherein the safety equipment is secured to the trailer, the arm securing means is secured to the first lengthwise edge of the trailer adjacent the first widthwise edge of the trailer, the arm extends from the trailer so as to be adjacent the first widthwise edge, the articulating portion securing means orients the arm so as not to be parallel to the first lengthwise edge and the first widthwise edge of the trailer, the post extends from the arm in an upward direction, and the cable extends along the lengthwise direction of the trailer.

15. Safety equipment mounted to a trailer for transporting cargo, the trailer having a bed structure for supporting the cargo, a length, a width transverse to the length, a periphery surrounding the bed structure and defined by first and second lengthwise edges and first and second widthwise edges of the trailer, a first rail parallel to the first lengthwise edge, and a second rail parallel to the second lengthwise edge, the safety equipment comprising first and second arm assemblies and a cable secured therebetween so as to extend in a lengthwise direction of the trailer, each of the first and second arm assemblies comprising:
   an arm having an articulating portion;
   means selectively securing the arm to one of the first and second lengthwise edges of the trailer at a location adjacent one of the first and second widthwise edges of the trailer;
   means associated with the arm for enabling the articulating portion thereof to pivot toward and away from the adjacent first or second widthwise edge of the trailer in a plane approximately parallel to the bed structure of the trailer;
   means for securing the articulating portion at any one of a plurality of articulated positions;
   a post extending from the arm in an upward direction transverse to the pivot plane of the articulating portion;
   a cable having a first portion thereof secured to the post; and
   means for tensioning the cable between the posts of the first and second arm assemblies.

16. The safety equipment according to claim 15, further comprising means for securing the post to the arm so that an upper distal end of the post extends away from the trailer, the post securing means comprising:
   means for pivoting the post in a plane approximately parallel to the bed structure; and means for pivoting the post in an approximately vertical plane.

17. The safety equipment according to claim 15, wherein the arm securing means comprises a bracket having a channel sized and oriented to receive the corresponding first or second rail and a clamp for securing the bracket to the trailer.

18. The safety equipment according to claim 15, further comprising:
a belt adapted to be worn around the waist of a person; and
means for securing the belt to the cable.

19. The safety equipment according to claim 18, wherein the belt securing means comprises means for allowing but resisting travel of the belt away from the cable.

20. The safety equipment according to claim 15, wherein the articulating portion securing means comprises a rod, tubular members on the rod and on the articulating portion, and a pin simultaneously receivable in a pair of the tubular members on the rod and on the articulating portion.

* * * * *